United States Patent
Lloyd

(10) Patent No.: US 9,858,273 B2
(45) Date of Patent: Jan. 2, 2018

(54) SPECULATIVE RENDERING DURING CACHE REVALIDATION

(71) Applicant: GOOGLE INC., Mountain View, CA (US)

(72) Inventor: Matthew Lloyd, Cambridge, MA (US)

(73) Assignee: Google LLC, Mountain View, CA (US)

( * ) Notice: Subject to any disclaimer, the term of this patent is extended or adjusted under 35 U.S.C. 154(b) by 750 days.

(21) Appl. No.: 13/887,812

(22) Filed: May 6, 2013

(65) Prior Publication Data

US 2015/0199344 A1 Jul. 16, 2015

Related U.S. Application Data

(63) Continuation of application No. 13/095,605, filed on Apr. 27, 2011, now Pat. No. 8,438,474.

(51) Int. Cl.
*G06F 17/30* (2006.01)

(52) U.S. Cl.
CPC .. *G06F 17/30011* (2013.01); *G06F 17/30902* (2013.01)

(58) Field of Classification Search
CPC ......... G06F 17/30902; G06F 17/30899; G06F 17/212; G06F 17/2247; G06F 17/30368; G06F 2216/13; G06F 17/30011
See application file for complete search history.

(56) References Cited

U.S. PATENT DOCUMENTS

| | | | |
|---|---|---|---|
| 6,157,930 A * | 12/2000 | Ballard et al. | |
| 6,233,606 B1 * | 5/2001 | Dujari | 709/213 |
| 6,377,957 B1 | 4/2002 | Jeyaraman | |
| 6,505,242 B2 | 1/2003 | Holland et al. | |
| 6,557,076 B1 | 4/2003 | Copeland et al. | |
| 6,606,525 B1 | 8/2003 | Muthuswamy et al. | |
| 6,654,766 B1 | 11/2003 | Degenaro et al. | |
| 6,744,452 B1 | 6/2004 | McBrearty et al. | |
| 6,883,135 B1 * | 4/2005 | Obata | G06F 17/30864 707/999.001 |
| 7,047,485 B1 * | 5/2006 | Klein | G06F 17/30902 707/E17.12 |
| 7,240,091 B1 * | 7/2007 | Hopmann et al. | 709/203 |
| 7,493,322 B2 * | 2/2009 | Franciosa et al. | |

(Continued)

OTHER PUBLICATIONS

Co-pending U.S. Appl. No. 13/095,605, filed Apr. 27, 2011, entitled "Speculative Rendering During Cache Revalidation," by Lloyd, 38 pages.

*Primary Examiner* — Wilson Tsui
(74) *Attorney, Agent, or Firm* — McDermott Will & Emery LLP

(57) ABSTRACT

A method may include storing, in a memory associated with a computer device, cached content associated with a document and receiving a request to access the document. The method may further include sending a request to revalidate the cached content to a server device associated with the document, performing speculative rendering of the document, using the cached content, the speculative rendering being performed as a plurality of work items, receiving revalidated content associated with the document, determining invalid ones of the plurality of work items based on the revalidated content, and discarding the invalid ones of the plurality of work items.

19 Claims, 9 Drawing Sheets

(56) References Cited

U.S. PATENT DOCUMENTS

| | | |
|---|---|---|
| 8,140,610 B2 | 3/2012 | Abdo et al. |
| 8,341,529 B1 * | 12/2012 | Li et al. .................. 715/741 |
| 8,977,653 B1 * | 3/2015 | Mahkovec et al. .......... 707/802 |
| 2003/0009563 A1 * | 1/2003 | Douglis et al. ............. 709/227 |
| 2003/0132958 A1 * | 7/2003 | Himmel et al. ............. 345/745 |
| 2004/0103199 A1 | 5/2004 | Chao et al. |
| 2004/0128346 A1 | 7/2004 | Melamed et al. |
| 2004/0168122 A1 | 8/2004 | Kobipalayam Murugaiyan |
| 2005/0195221 A1 * | 9/2005 | Berger et al. .............. 345/660 |
| 2006/0064636 A1 * | 3/2006 | Hua et al. .................. 715/526 |
| 2006/0117073 A1 * | 6/2006 | Bosworth et al. ........... 707/201 |
| 2010/0262780 A1 * | 10/2010 | Mahan et al. .............. 711/118 |
| 2012/0239598 A1 * | 9/2012 | Cascaval et al. ............ 706/12 |

* cited by examiner

US 9,858,273 B2

SPECULATIVE RENDERING DURING CACHE REVALIDATION

RELATED APPLICATION

This application is a continuation of U.S. patent application Ser. No. 13/095,605, filed Apr. 27, 2011, the disclosure of which is incorporated herein by reference.

BACKGROUND

Many techniques are available to users today to find information on the world wide web ("web"). For example, users often use web browsers and/or search engines to find information of interest. A user may enter a search query into a search box of a browser and the browser may submit the search query to a search engine. The search engine may identify documents that match the search query, rank the documents based on various factors, and return a ranked list of documents to the user. The user may select a document from the list and request the document. A browser may retrieve the requested document and display the document to the user in a browser window. A user may have to wait for the document to be displayed and waiting for the document to be displayed may negatively impact the user's browsing user experience.

SUMMARY

According to one aspect, a method, performed by a computer device, may include storing, in a memory associated with the computer device, cached content associated with a document; receiving a request to access the document; sending, by the computer device, a request to revalidate the cached content to a server device associated with the document; performing, by the computer device, speculative rendering of the document, using the cached content, the speculative rendering being performed as a plurality of work items; receiving, by the computer device, revalidated content associated with the document; determining, by the computer device, invalid ones of the plurality of work items based on the revalidated content; and discarding, by the computer device, the invalid ones of the plurality of work items.

According to another aspect, a computer device may include a memory to store cached content associated with a document; and a processor to receive a request to access the document; send a request to revalidate the cached content, associated with the document, to a server device associated with the document; perform speculative rendering of the document, using the cached content stored in the memory; construct a graph of work items while performing the speculative rendering, where the graph of work items keeps track of interdependencies between the work items; receive, from the server device and in response to the request, revalidated content associated with the document; determine invalid content by comparing the revalidated content with the cached content; determine invalid ones of the work items as ones of the work items that correspond to, or depend on, the invalid content, based on the constructed graph of work items; discard the invalid ones of the work items; and render the document using the revalidated content and using ones of the work items that were not discarded.

According to yet another aspect, a computer-readable medium, storing instructions executable by one or more processors, may include one or more instructions to receive a request to access a document; one or more instructions to retrieve a cached content associated with the document, in response to receiving the request; one or more instructions to send a request to revalidate the cached content to a server device associated with the document; one or more instructions to perform speculative rendering of the document, using the cached content; one or more instructions to construct a graph of work items while performing the speculative rendering, where the graph of work items keeps track of interdependencies between the work items; one or more instructions to receive, from the server device, revalidated content associated with the document; one or more instructions to determine invalid content by comparing the revalidated content with the cached content; one or more instructions to determine invalid ones of the work items as ones of the work items that correspond to, or depend on, the invalid content, based on the constructed graph of work items; one or more instructions to discard the invalid ones of the work items; and one or more instructions to render the document using the revalidated content and using ones of the work items that were not discarded.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
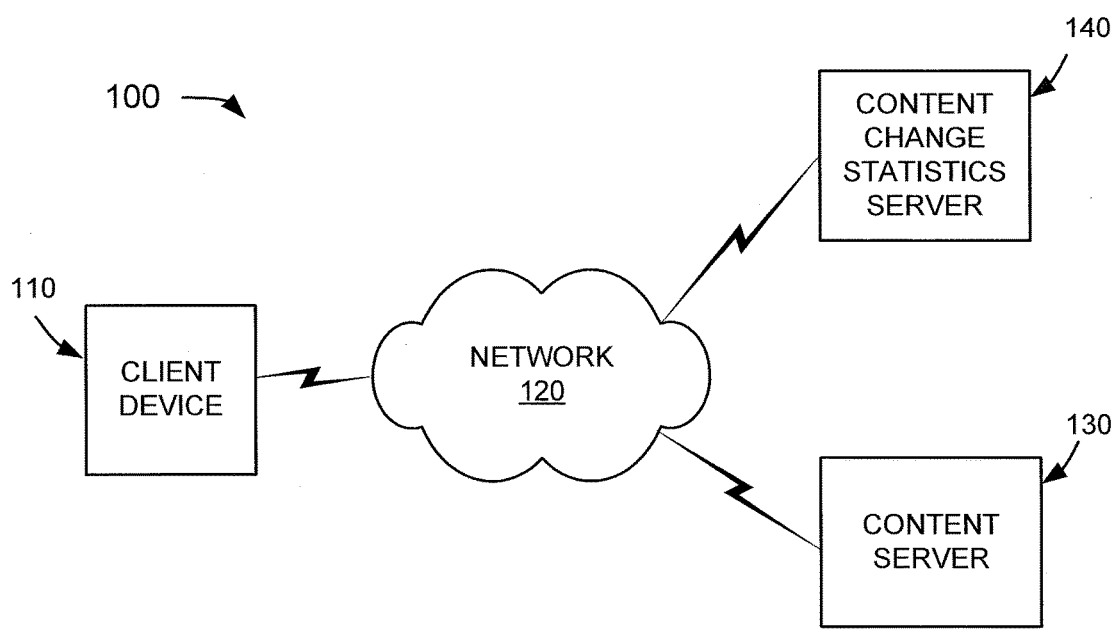
FIG. 1 is a diagram of an example environment in which systems and methods described herein may be implemented.

The following detailed description of the invention refers to the accompanying drawings. The same reference numbers may be used in different drawings to identify the same or similar elements. Also, the following detailed description does not limit the invention.

When a client device requests a document from a content server (e.g., when a user requests a document via a browser), the client device may have previously accessed the document and the client device may thus store a cached version of the document. However, the document may require revalidation before being displayed (e.g., based on cache control headers stored with the cached copy) and the client device may need to send a revalidation request to a content server associated with the requested document. On slow networks, revalidation may take hundreds of milliseconds or even several seconds. The browser may not be able to render the document while waiting for revalidation, as the browser may be waiting for revalidation of a critical resource which may need to be processed before continuing. Content revalidation may add substantially to total document load time.

An implementation described herein may relate to speculative rendering of a document. While waiting for the revalidated content, the client device may make the assumption that the cached version of the document is still valid and may speculatively continue to render the document. If the content of the document has not changed, the speculative rendering may save time, since the client device has already performed at least some of the rendering process when the revalidation has been received. If the content of the document has changed, in a worst case situation the client device can throw away the work depending on the speculative rendering, which would be no slower than not having done the work in the first place. In a better situation, only some of the work depending on the speculative rendering may need to be discarded, therefore still saving time over not having done the work in the first place.

In rendering the document, many interdependencies may exist between work items associated with rendering of the document. A work item may correspond to, for example, a process to be performed (e.g., building of a document object model tree, building of a render tree, rendering an offscreen bitmap, and/or rendering to screen surface of a display device), a resource to be retrieved (e.g., an index file, a cascading style sheets (CSS) file, a text file, an image, an audio or video file, a client-side scripting file), and/or a procedural process to be executed (e.g., a sequence of steps to be carried out, such as while processing a CSS file and/or executing a client-side scripting file). A procedural process to be executed is also referred to herein as a "procedural work item."

An implementation described herein may include keeping track of the interdependencies of the work items in the document by generating an acyclic directed graph of the work items that are being performed during the speculative rendering using the cached version of the document. When revalidation is received from the content server, work items that depend on changed content may be discarded, along with any work items that depend on the changed content, and work items that do not depend on changed content may be retained.

An implementation described herein may further relate to determining whether to render, to a screen surface (e.g., render to a display device), the speculatively rendered content based on a content change probability score associated with the document being rendered speculatively. The content change probability score may depend on a time and date when the document was last accessed, a maximum cache age associated with the document, a content type associated with the document, an update frequency associated with the document, an update history associated with the document, one or more keywords or phrases associated with the document, or a combination of one or more of these factors. If the content change probability score is less than a content change probability threshold, or if the client device has been waiting for revalidation longer than a revalidation wait time threshold, the speculatively rendered content may be rendered to the screen surface prior to revalidation of the content.

Special considerations may need to be taken into account when dealing with procedural work items that include a set of instructions that must be carried out in sequence, such as a Javascript file. An implementation described herein may include recording an environment associated with a procedural work item, speculatively executing the procedural work item based on a cached version of the procedural work item, and stopping execution of the procedural work item if an instruction is detected that includes a network request or a request to write to persistent storage of the client device. If an instruction is detected that includes a network request or a request to write to persistent storage of the client device, no speculative execution of the procedural work item may be performed and the client device may need to wait for revalidation. If the revalidated procedural work item differs from the cached version of the procedural work item, work depending on the cached version of the procedural work item may be discarded and the recorded environment of the procedural work item may be restored to a state that existed prior to execution of the revalidated procedural work item.

A "document," as the term is used herein, is to be broadly interpreted to include any machine-readable and machine-storable work product. A document may include, for example, an e-mail, a web page or a web site, a file, a combination of files, one or more files with embedded links to other files, a news group posting, a news article, a blog, a business listing, an electronic version of printed text, a web advertisement, etc. In the context of the web (i.e., the Internet), a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Example Environment

FIG. 1 is a diagram of an example environment 100 in which systems and/or methods described herein may be implemented. As shown in FIG. 1, environment 100 may include a client device 110, a network 120, a content server 130, and a content change statistics server 140. While FIG. 1 illustrates a single client device 110, a single content server 130, and a single content change statistics server 140, in practice, environment 100 may include multiple client devices 110, multiple content servers 130, and/or multiple content change statistics servers 140.

Client device 110 may include a communication or computation device, such as a personal computer, a wireless telephone, a personal digital assistant (PDA), a lap top, or another type of computation or communication device. In one implementation, a client device 110 may include an application that permits documents to be searched and/or accessed. Client device 110 may also include software, such as a plug-in, an applet, a dynamic link library (DLL), or another executable object or process, that may operate in conjunction with (or be integrated into) the application to implement speculative rendering of content during cache revalidation. Client device 210 may obtain the software from a particular software providing server device (not shown in FIG. 1), or from a third party, such as a third party server, disk, tape, network, CD-ROM, etc. Alternatively, the software may be pre-installed on client device 110. For the description to follow, the software will be described as integrated into the application.

In one example, the application may include a web browser running Hypertext Transfer Protocol (HTTP) and/or Cascading Style Sheets (CSS). In another example, the application may include a program that uses any network protocol that fetches cacheable resources, such as, for example, SPDY (a Transmission Control Protocol (TCP)-based application level protocol for transporting web content), File Transfer Protocol (FTP), BitTorrent protocol, and/or any proprietary file transfer protocol. In yet another example, client device 110 may correspond to a mobile device and the application may include a program that uses a transfer protocol associated with an operating system running on the mobile device (e.g., Android or iOS).

Network 120 may include any type of network, such as a local area network (LAN), a wide area network (WAN), a metropolitan area network (MAN), a wireless network, such as a general packet radio service (GPRS) network, an ad hoc network, a telephone network (e.g., the Public Switched Telephone Network (PSTN) or a cellular network), an intranet, the Internet, or a combination of networks. Client device 110, content server 130, and content change statistics server 140 may connect to network 120 via wired and/or wireless connections.

Content server 130 may include one or more devices (e.g., server devices) that provide content to client device 110. For example, a browser, at client device 110, may request a document associated with a particular Uniform Resource Identifier (URI), and a Domain Name Server (DNS) (not shown in FIG. 1) may translate the URI into an Internet Protocol (IP) address associated with content server 130. Client device 110 may then request the particular document from content server 130 and content server 130 may send information associated with the particular document to client device 110 across network 120. The information may include content associated with the particular document as well as metadata associated with the particular document. The metadata may include cache control headers that may inform the browser about when the content was last modified, how long the content should be kept in the browser's cache, and/or whether the browser should revalidate the content before using a cached copy in the future. In one example, content server 130 may correspond to a host of a particular web site.

Content change statistics server 140 may include one or more devices that store statistics about particular documents and/or about particular content servers 130. For example, content change statistics sever 140 may store statistics relating to a frequency of change of content associated with a particular document, associated with a particular type of document (e.g., based on a content type and/or category or topic classification), associated with a particular web site (e.g., hosted by content server 130), and/or associated with one or more particular keywords or phrases. For example, the statistics may include a date and/or time when the content was last modified, an update frequency of the content, and/or an update history of the content. In one example, content change statistics server 140 may query particular content servers 130 for statistics information at particular intervals or may receive the statistics information from particular content servers 130 at particular intervals without having to query for the statistics information. Additionally or alternatively, content change statistics server 140 may receive statistics information from a browser associated with client device 110. For example, the browser may provide information from metadata, received in association with the content of a particular document from a particular content server 130, to content change statistics server 140. Content change statistics server 140 may perform analysis on any received statistics data to determine, for example, an update frequency, and/or other parameters, for content associated with a particular document, associated with a particular type of document (e.g., based on a content type and/or category or topic classification), associated with a particular web site (e.g., hosted by content server 130), and/or associated with one or more particular keywords or phrases.

Although FIG. 1 shows example components of environment 100, in other implementations, environment 100 may include fewer components, different components, additional components, or differently arranged components than depicted in FIG. 1. Additionally or alternatively, one or more components of environment 100 may perform one or more tasks described as being performed by one or more other components of environment 100. For example, in one implementation, functions described as being performed by content change statistics server 140 may be implemented by browser software running on client device 110, rather than being implemented by a remote device.

Example Devices

Figure 2:
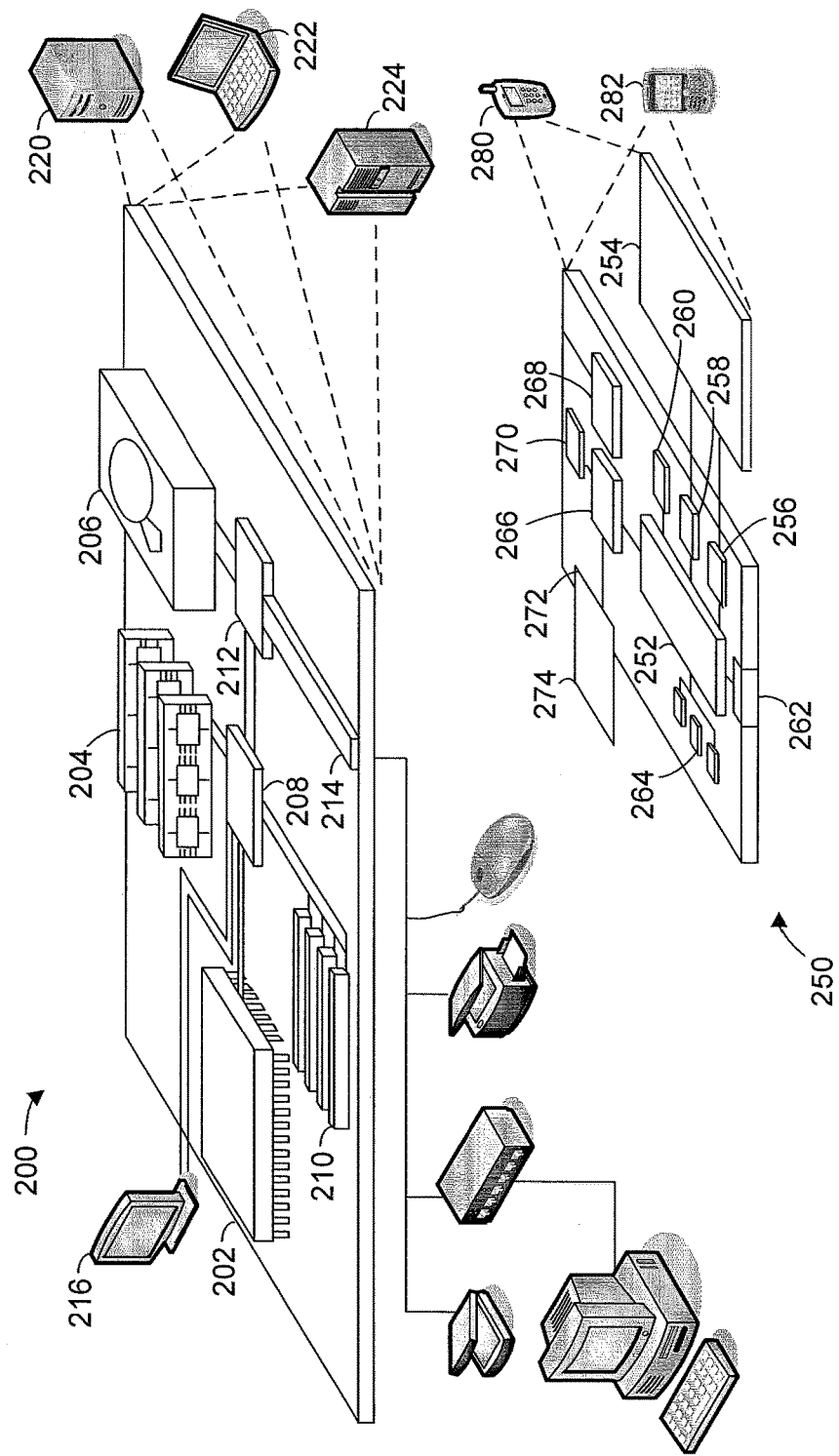
FIG. 2 is a diagram of example components of a client device or a server device according to an implementation described herein.

FIG. 2 is a diagram of example components of a generic computing device 200 and a generic mobile computing device 250, which may be used with the techniques described herein. Computing device 200 is intended to represent various forms of digital computers, such as laptops, desktops, workstations, personal digital assistants, servers, blade servers, mainframes, and other appropriate computers. Mobile computing device 250 is intended to represent various forms of mobile devices, such as personal digital assistants, cellular telephones, smart phones, and other similar computing devices. The components shown here, their connections and relationships, and their functions, are meant to be examples only, and are not meant to limit implementations described and/or claimed in this document.

Computing device 200 may correspond to client device 110, client server 130, and/or content change statistics server 140. For example, each of client device 110, client server 130, and/or content change statistics server 140 may include one or more computing devices 200. Mobile computing device 250 may correspond to client device 110 and/or to content server 130. For example, each of client device 110 and/or content server 130 may include one or more mobile computing devices 250.

Computing device 200 may include a processor 202, memory 204, a storage device 206, a high-speed interface 208 connecting to memory 204 and high-speed expansion ports 210, and a low speed interface 212 connecting to low speed bus 214 and storage device 206. Each of the components 202, 204, 206, 208, 210, and 212, may be interconnected using various busses, and may be mounted on a common motherboard or in other manners as appropriate. Processor 202 may process instructions for execution within computing device 200, including instructions stored in the memory 204 or on storage device 206 to display graphical information for a graphical user interface (GUI) on an external input/output device, such as display 216 coupled to high speed interface 208. In another implementation, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system, etc.).

Memory 204 may store information within computing device 200. In one implementation, memory 204 may include a volatile memory unit or units. In another implementation, memory 204 may include a non-volatile memory unit or units. Memory 204 may also be another form of computer-readable medium, such as a magnetic or optical disk. A computer-readable medium may be defined as a non-transitory memory device. A memory device may include memory space within a single physical memory device or spread across multiple physical memory devices.

Storage device 206 may provide mass storage for computing device 200. In one implementation, storage device 206 may include a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described below. The information carrier may include a computer- or machine-readable medium, such as memory 204, storage device 206, or memory included within processor 202.

High speed controller 208 may manage bandwidth-intensive operations for computing device 200, while low speed controller 212 may manage lower bandwidth-intensive operations. Such allocation of functions is an example only. In one implementation, high-speed controller 208 may be coupled to memory 204, display 216 (e.g., through a graphics processor or accelerator), and to high-speed expansion ports 210, which may accept various expansion cards (not shown). In the implementation, low-speed controller 212 may be coupled to storage device 206 and to low-speed expansion port 214. Low-speed expansion port 214, which may include various communication ports (e.g., USB, Bluetooth, Ethernet, wireless Ethernet) may be coupled to one or more input/output devices, such as a keyboard, a pointing device, a scanner, or a networking device, such as a switch or router, e.g., through a network adapter.

Computing device 200 may be implemented in a number of different forms, as shown in FIG. 2. For example, it may be implemented as a standard server 220, or multiple times in a group of such servers. It may also be implemented as part of a rack server system 224. Additionally or alternatively, computing device 200 may be implemented in a personal computer, such as a laptop computer 222. Additionally or alternatively, components from computing device 200 may be combined with other components in a mobile device (not shown), such as mobile computing device 250. Each of such devices may contain one or more of computing device 200, mobile computing device 250, and/or an entire system may be made up of multiple computing devices 200 and/or mobile computing devices 250 communicating with each other.

Mobile computing device 250 may include a processor 252, a memory 264, an input/output (I/O) device such as a display 254, a communication interface 266, and a transceiver 268, among other components. Mobile computing device 250 may also be provided with a storage device, such as a micro-drive or other device (not shown), to provide additional storage. Each of components 250, 252, 264, 254, 266, and 268, may be interconnected using various buses, and several of the components may be mounted on a common motherboard or in other manners as appropriate.

Processor 252 may execute instructions within mobile computing device 250, including instructions stored in memory 264. Processor 252 may be implemented as a set of chips that may include separate and multiple analog and/or digital processors. Processor 252 may provide, for example, for coordination of the other components of mobile computing device 250, such as, for example, control of user interfaces, applications run by mobile computing device 250, and/or wireless communication by mobile computing device 250.

Processor 252 may communicate with a user through control interface 258 and a display interface 256 coupled to a display 254. Display 254 may include, for example, a TFT LCD (Thin-Film-Transistor Liquid Crystal Display), an OLED (Organic Light Emitting Diode) display, and/or other appropriate display technology. Display interface 256 may comprise appropriate circuitry for driving display 254 to present graphical and other information to a user. Control interface 258 may receive commands from a user and convert them for submission to processor 252. In addition, an external interface 262 may be provide in communication with processor 252, so as to enable near area communication of mobile computing device 250 with other devices. External interface 262 may provide, for example, for wired communication in some implementations, or for wireless communication in other implementations, and multiple interfaces may also be used.

Memory 264 may store information within mobile computing device 250. Memory 264 can be implemented as one or more of a computer-readable medium or media, a volatile memory unit or units, or a non-volatile memory unit or units. Expansion memory 274 may also be provided and connected to mobile communication device 250 through expansion interface 272, which may include, for example, a SIMM (Single In Line Memory Module) card interface. Such expansion memory 274 may provide extra storage space for mobile computing device 250, or may also store applications or other information for mobile computing device 250. Specifically, expansion memory 274 may include instructions to carry out or supplement the processes described above, and may also include secure information. Thus, for example, expansion memory 274 may be provided as a security module for mobile computing device 250, and may be programmed with instructions that permit secure use of mobile computing device 250. In addition, secure applications may be provided via SIMM cards, along with additional information, such as placing identifying information on a SIMM card in a non-hackable manner.

Memory 264 and/or expansion memory 274 may include, for example, flash memory and/or NVRAM memory, as discussed below. In one implementation, a computer program product may be tangibly embodied in an information carrier. The computer program product may store instructions that, when executed, perform one or more methods, such as those described above. The information carrier may correspond to a computer- or machine-readable medium, such as the memory 264, expansion memory 274, or memory included within processor 252, that may be received, for example, over transceiver 268 or over external interface 262.

Mobile computing device 250 may communicate wirelessly through a communication interface 266, which may include digital signal processing circuitry where necessary. Communication interface 266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 268. In addition, short-range communication may occur, such as using a Bluetooth, WiFi, or other such transceiver (not shown). In addition, a Global Positioning System (GPS) receiver module 270 may provide additional navigation- and location-related wireless data to mobile computing device 250, which may be used as appropriate by applications running on mobile computing device 250.

Mobile computing device 250 may also communicate audibly using an audio codec 260, which may receive spoken information from a user and convert it to usable digital information. Audio codec 260 may likewise generate audible sound for a user, such as through a speaker, e.g., in a handset of mobile computing device 250. Such sound may include sound from voice telephone calls, may include recorded sound (e.g., voice messages, music files, etc.) and may also include sound generated by applications operating on mobile computing device 250.

Mobile computing device 250 may be implemented in a number of different forms, as shown in FIG. 2. For example, it may be implemented as a cellular telephone 280. It may also be implemented as part of a smart phone 282, personal digital assistant (not shown), and/or other similar mobile device.

Various implementations of the systems and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and may be implemented in a high-level procedural and/or object-oriented programming language, and/or in assembly/machine language. As used herein, the terms "machine-readable medium" "computer-readable medium" may refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described herein may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

Although FIG. 2 shows example components of computing device 200 and mobile computing device 250, computing device 200 or mobile computing device 250 may include fewer components, different components, additional components, or differently arranged components than depicted in FIG. 2. Additionally or alternatively, one or more components of computing device 200 or mobile computing device 250 may perform one or more tasks described as being performed by one or more other components of computing device 200 or mobile computing device 250.

Figure 3:
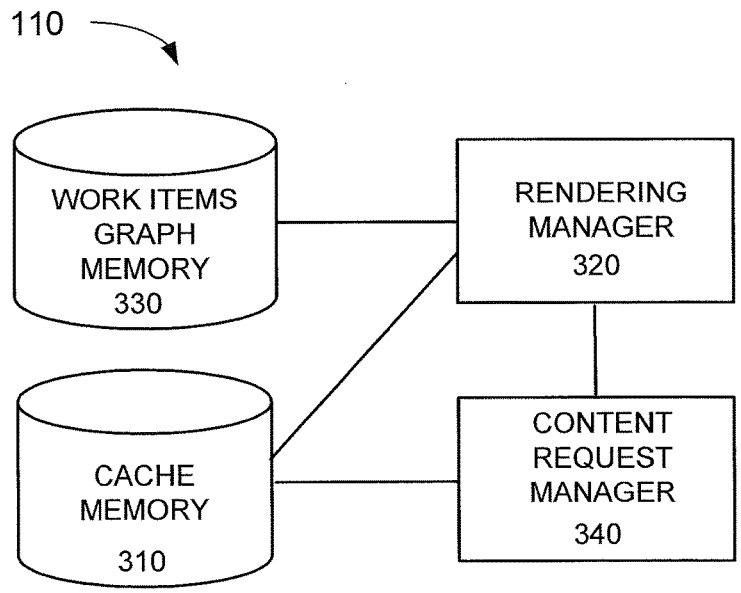
FIG. 3 is a diagram of example functional components of a client device according to an implementation described herein.

FIG. 3 is a diagram of example functional components of client device 110. As shown in FIG. 3, client device 110 may include a cache memory 310, a rendering manager 320, a work items graph memory 330, and a content request manager 340.

Cache memory 310 may store cached versions of documents received from a particular content server 130. Examples of fields that may be stored in cache memory 310 are described below with reference to FIG. 4.

Rendering manager 320 may render a requested document. Rendering may include a process of converting content associated with a document into a bitmap that is displayed (e.g., via a browser) on a display device (e.g., display 216 or display 254) of client device 110. If a cached version of a document exists, rendering manager 320 may perform speculative rendering of the document using cached content. Rendering manager 320 may generate an acyclic directed graph of work items that are performed during the speculative rendering and may use the graph of work items to keep track of interdependencies of the work items while speculative rendering is performed. Work items graph memory 330 may store information about the graph of work items during speculative rendering. Rendering manager 320 may discard work items associated with changed content, as well as any work items that depend from the work items associated with the changed content, in response to receiving revalidated content from content server 130, and may resume rendering using the revalidated content.

While performing speculative rendering using a cached version of the document, rendering manager 320 may determine whether to render, to a screen surface, the speculatively rendered content prior to revalidation, based on how long client device 110 has been waiting for revalidation and/or based on a probability of content change associated with the requested document. Rendering manager 320 may also request information relating to a probability of content change, associated with the requested document, from content change statistics server 140.

Rendering manager 320 may speculatively execute procedural work items associated with the graph of work items for the requested document. Prior to speculatively executing a procedural work item, rendering manager 320 may record an environment associated with the procedural work item. If rendering manager 320 encounters an instruction to perform a network request or to write to persistent storage associated with client device 110, rendering manager 320 may stop speculative execution of the procedural work item and wait for revalidation. If, after revalidation of the procedural work item, rendering manager 320 determines that the procedural work item has changed, rendering manager 320 may discard the work performed speculatively using the cached version and may restore the environment associated with the procedural work item that has been previously recorded. If, after revalidation of the procedural work item, rendering manager 320 determines that the procedural work item has not changed, rendering manager 320 may continue processing the procedural work item without interruption.

Content request manager 340 may determine revalidation instructions stored in cached memory 310 in association with a cached version of a document and may request, from content server 130, revalidation of content associated with the document when client device 110 requests to access the document. Content request manager 340 may receive revalidated content, associated with the requested document, from content server 130.

Although FIG. 3 shows example functional components of client device 110, in other implementations, client device 110 may include fewer functional components, different functional components, additional functional components, or differently arranged functional components than depicted in FIG. 3. Additionally or alternatively, one or more functional components of client device 110 may perform one or more tasks described as being performed by one or more other functional components of client device 110.

Figure 4:
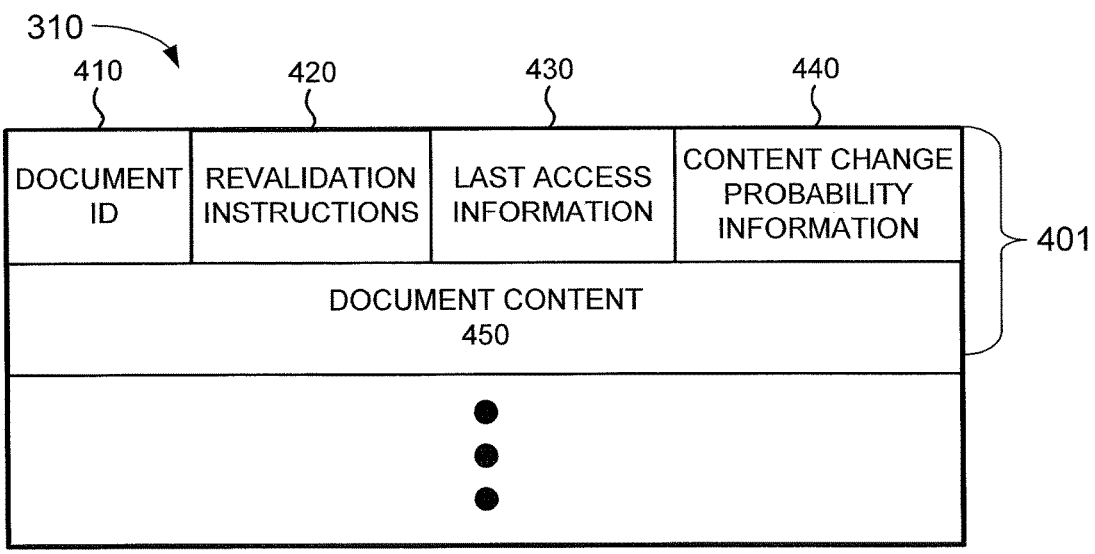
FIG. 4 is a diagram of example data fields that may be stored in a cache memory according to an implementation described herein.

FIG. 4 is a diagram of example information that may be stored in cache memory 310. Cache memory 310 may be implemented as part of one or more of memory 204, storage device 206, memory 264, and/or expansion memory 274. As shown in FIG. 4, cache memory 310 may include one or more cache records 401. A cache record 401 may store information about a particular document previously accessed by client device 110. Cache record 401 may include a document identification (ID) field 410, a revalidation instructions field 420, a last access information field 430, a content change probability information field 440, and a document content field 450.

Document ID field 410 may store information identifying a particular document. For example, document ID field may store a Uniform Resource Locator (URL) associated with the document, and/or may include another string that uniquely identifies the document.

Revalidation instructions field 420 may store one or more cache control headers that include information about when content associated with the document was last modified, a maximum cache age associated with the document (e.g., how long the cached version should be stored), and/or whether client device 110 should revalidate the content before using the cached copy.

Last access information field 430 may store information about when the document was last accessed. Content change probability information field 440 may store information associated with a probability that the content of the document has changed, such as a particular content type associated with the document along with a content change probability associated with the particular content type, an update frequency associated with the document, an update history associated with the document, one or more particular keywords or phrases associated with the document along with a content change probability associated with the one or more particular keywords or phrases, and/or a content change probability score associated with the document.

Document content field 450 may store cached content associated with the document.

Although FIG. 4 shows example fields of cache record 401, in other implementations, cache record 401 may include fewer fields, different fields, additional fields, or differently arranged fields than depicted in FIG. 4.

Figure 5:
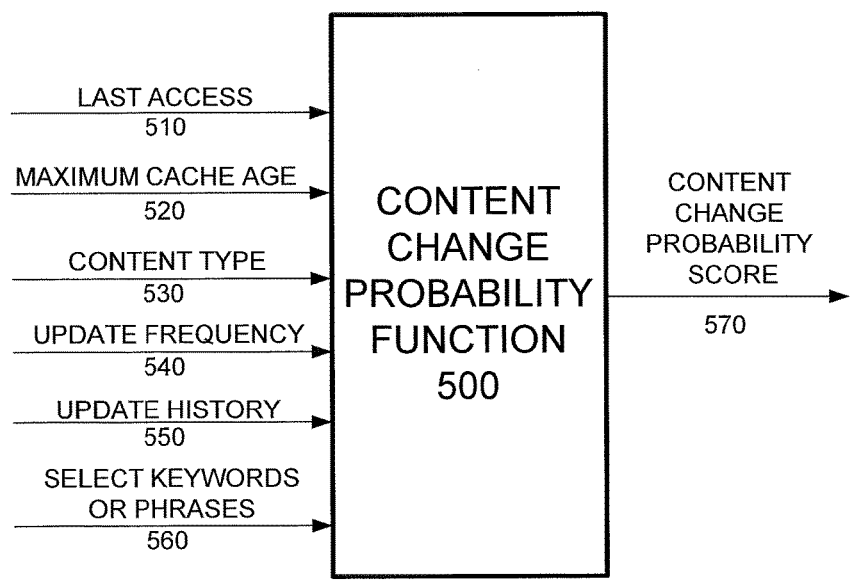
FIG. 5 is a diagram of an example function for generating a content change probability score according to an implementation described herein.

FIG. 5 is a diagram of an example content change probability function 500 according to an implementation described herein. Content change probability function 500 may be used to compute a content change probability score for a particular document. Content change probability function 500 may take, as input, values for one or more of the depicted parameters and generate, with respect to a particular document, a content change probability score 570 for the particular document.

Content change probability function 500 may include a last access input 510. Last access input 510 may include information indicating a date and/or time when the particular document was last accessed (e.g., requested by client device 110 from content server 130). A benefit of using information indicating a date and/or time when the particular document was last accessed, when determining content change probability score 570, may include taking into account the fact that the more time that has passed since the particular document has last been accessed, the more likely it may be that the content of the particular document has changed. For example, an older date and/or time, associated with last access input 510, may increase content change probability score 570.

Content change probability function 500 may include a maximum cache age input 520. Maximum cache age input 520 may include information indicating a maximum cache age associated with the particular document (e.g., how long the cached content associated with the document is allowed to stay in the cache before being purged). A benefit of using information indicating a maximum cache age associated with the particular document, when determining content change probability score 570, may include taking into account the fact that the higher the maximum cache age of the document, the less likely it may be for the content of the document to change. For example, a higher maximum cache age, associated with maximum cache age input 520, may decrease content change probability score 570.

Content change probability function 500 may include a content type input 530. Content type input 530 may include information indicating a particular content type associated with the particular document. A benefit of using information indicating a particular content type associated with the particular document, when determining content change probability score 570, may include taking into account the fact that different types of content may be associated with different content change probabilities. For example, a document that includes blog posts may be more likely to change in content than a document corresponding to an image. For example, a first type of content may be increase content change probability score 570 and a second type of content may decrease content change probability score 570.

Content change probability function 500 may include an update frequency input 540. Update frequency input 540 may include information indicating how often content, associated with the particular document, changes. A benefit of using information indicating an update frequency associated with the particular document, when determining content change probability score 570, may include taking into account the fact that different documents may be associated with different update frequencies. For example, a document with a higher update frequency may increase content change probability score 570 over a document with less frequent updates.

Content change probability function 500 may include an update history input 550. Update history input 550 may include information about particular content updates associated with the particular document. For example, the particular document may be associated with a low update frequency, yet the particular document may have been recently updated. A benefit of using the update history of the particular document, when determining content change probability score 570, may include taking into account information about the update history of the particular document that may differ from other information about a content change probability associated with the particular document (e.g., based on an update frequency). For example, a document with an update history that includes a recent update may increase content change probability score 570, whereas a document that did not experience any recent updates may have a corresponding content change probability score 570 that is not affected.

Content change probability function 500 may include select keywords or phrases input 560. Select keyword or phrases input 500 may include information about whether the particular document is associated with a particular one or more keywords or phrases that are associated with a particular update frequency. A benefit of using select keywords or phrases, when determining content change probability score 570, may include identifying documents associated with particular keyword or phrases with a particular content change probability. For example, if a document is associated with terms indicative of frequent or recent content change, such as "news," "blog," "update," or a particular date (e.g., a date close to a present date), content change probability score 570 may be increased whereas a document, which is not associated with terms indicative of frequent or recent content change, may have a corresponding content change probability score 570 that is not affected.

Inputs of content change probability function 500 may be combined to generate content change probability score 570. In one implementation, inputs content change probability function 500 may be combined as a weighted sum. In other words, a particular input of content change probability function 500 may be multiplied by a particular weight and the results may be added to generate content change probability score 570. In another implementation, inputs of content change probability function 500 may be combined using a different technique.

Although FIG. 5 shows example inputs of content change probability function 500, in other implementations, content change probability function 500 may include fewer inputs, different inputs, or additional inputs than depicted in FIG. 5.

Example Processes

Figure 6A:
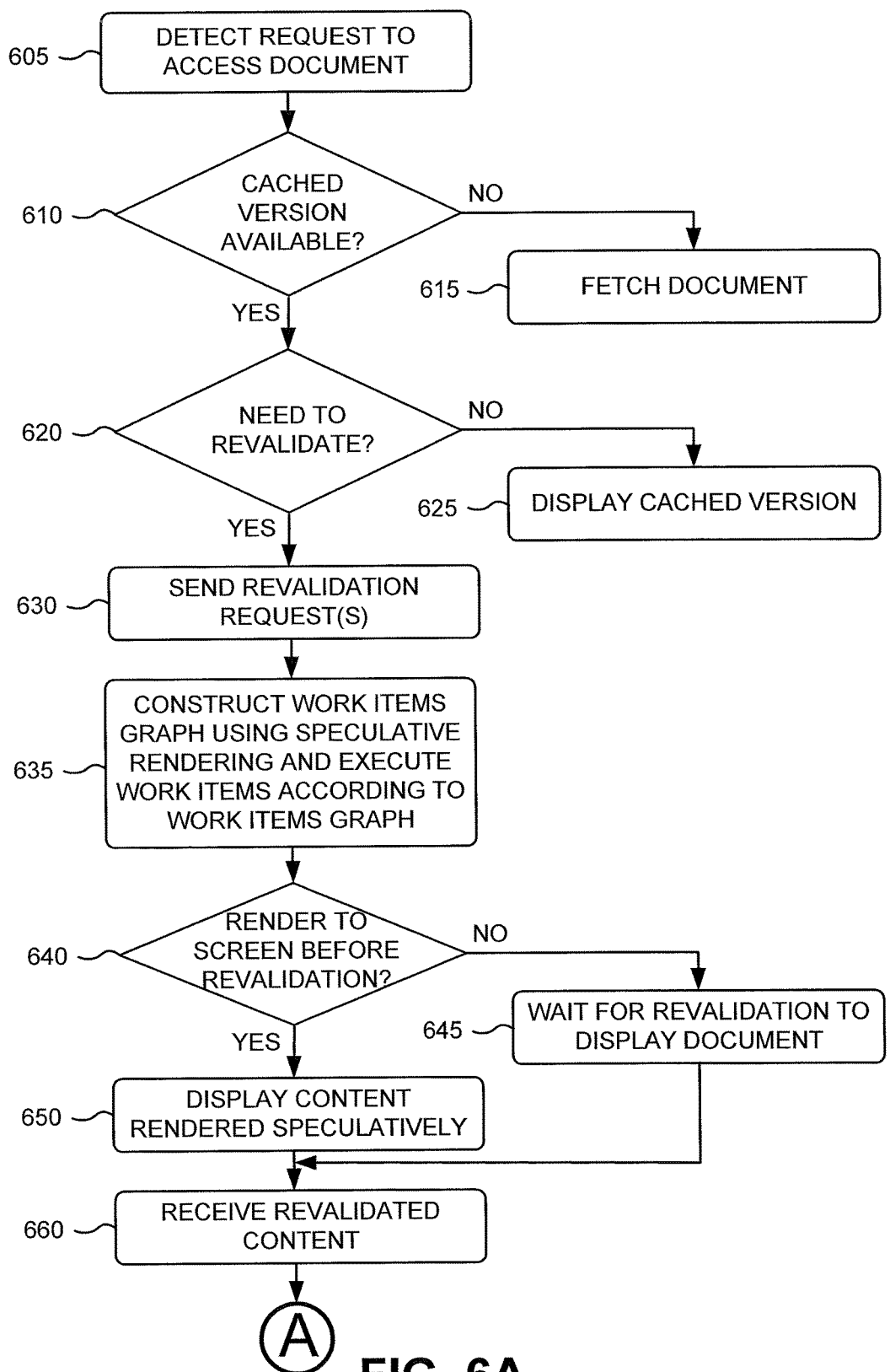
FIGS. 6A-6B are flowcharts of an example process for speculative rendering of content according to an implementation described herein.
Figure 6B:
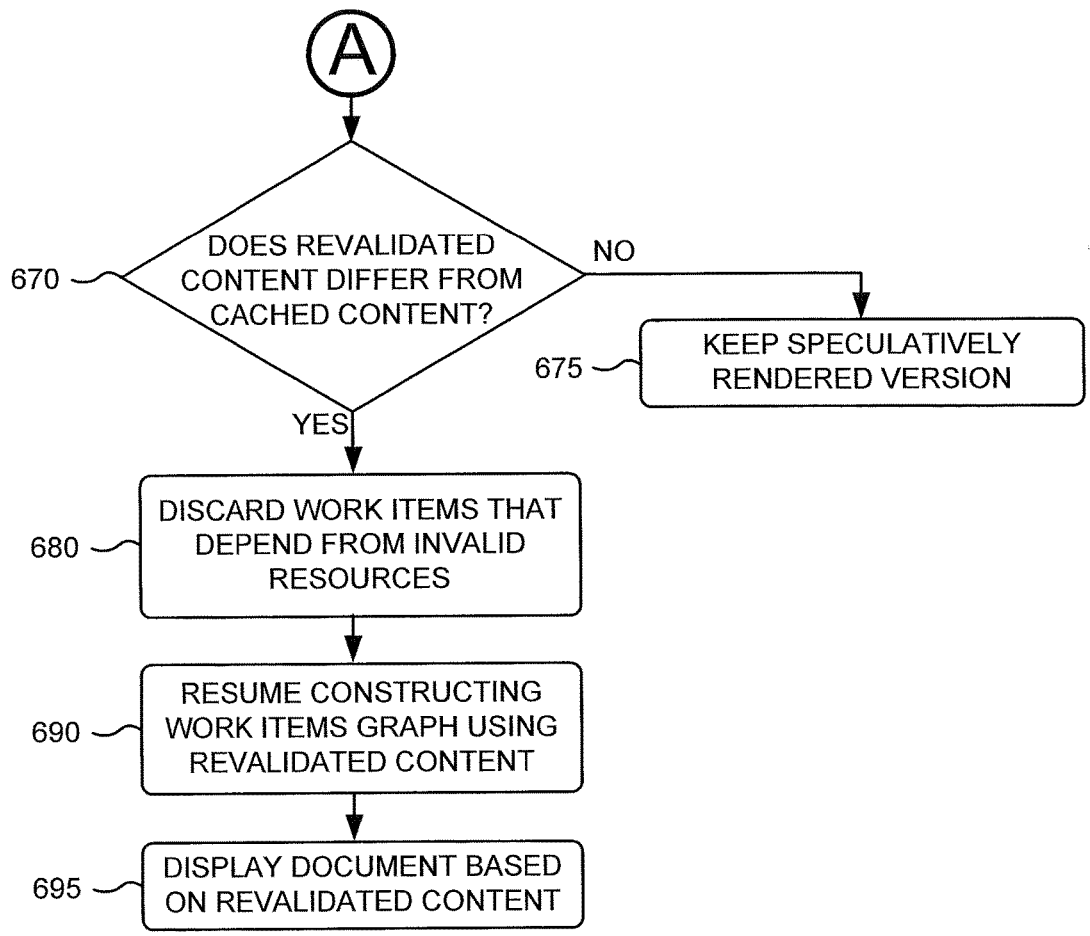

FIGS. 6A-6B are flowcharts of an example process for speculative rendering of content according to an implementation described herein. In one implementation, the process of FIGS. 6A-6B may be performed by client device 110. In other implementations, some or all of the process of FIGS. 6A-6B may be performed by another device or a group of devices separate and/or possibly remote from or including client device 110.

The process of FIG. 6A may include detecting a request to access a document (block 605). For example, a user may request to access a particular document by typing a Uniform Resource Locator (URL) into an address bar of a browser or by clicking on a hyperlink in a document being displayed by the browser.

A determination may be made as to whether a cached version is available (block 610). For example, rendering manager 320 may access cache memory 310 to determine whether a cached version of the document is stored in cache memory 310 (e.g., by checking document ID field 410 of document records 401). If it is determined that a cached version is not available (block 610—NO), the document may be fetched (block 615). For example, content request manager 340 may send a request to content server 130 to access the particular document. Since no cached version is available, no speculative rendering may be performed.

If it is determined that a cached version is available (block 610—YES), a determination may be made as to whether there is a need to revalidate the content (block 620). For example, rendering manager 320 may access revalidation instructions field 420 of document record 401 associated with the particular document to determine whether the content needs to be revalidated before being rendered. In one example, the revalidation instructions may include instructions to automatically revalidate the content every time the document is requested. In another example, the revalidation instructions may include instructions to revalidate the content if a maximum cache age has been exceeded (e.g., the cached version of the document has been stored in cache memory 310 longer than the maximum cache age). In yet another example, the revalidation instructions may include instructions to revalidate particular resources associated with the particular document (e.g., a particular image or CSS file). In yet another example, there may not be any revalidation instructions, indicating that there is no need to revalidate the content of the particular document.

If it is determined that there is no need to revalidate (block 620—NO), a cached version of the document may be displayed (block 625). For example, rendering manager 320 may display the content stored in document content field 450 of document record 401 associated with the particular document, without content request manager 340 requesting revalidation of the content from content server 130.

If it is determined that there is a need to revalidate (block 620—YES), a revalidation request may be sent (block 630). For example, content request manager 340 may send a request to content server 130 to revalidate the content associated with the particular document. While client device 110 awaits revalidation from content server 130, speculative rendering may be performed.

A work items graph may be constructed and executed using speculative rendering (block 635). For example, rendering manager 320 may start the process of rendering the particular document and may represent the process of rendering the particular document as a directed acyclic graph of work items, where each work item is represented as a node and where a directed edge from work item A to work item B represents the fact that work item B depends on the result of work item A. A work item may correspond to, for example, a process to be performed, a resource to be retrieved, and/or a procedural process to be executed. The generated graph of work items may be used by rendering manager 320 to keep track of dependencies of work items. By keeping track of the dependencies, rendering manager 320 may be able to determine which work items to discard if a particular work item becomes invalidated based on revalidated content received from content server 130 (e.g., based on content that has changed). The graph may be generated by rendering manager 320 "on the fly" as work items are processed. In other words, rendering manager 320 may not necessarily construct the graph and proceed to process work items after the graph is constructed. Rendering manager 320 may store information about the graph of work items in work items graph memory 330. For example, rendering manager 320 may create a graph data structure that includes an entry for each work item that is being processed along with pointers to other work items that depend from the work item.

If the document includes embedded iframes, each iframe may be associated with a particular width and height of the screen surface. Thus, each iframe may be treated separately and may be associated with its own work item graph.

A determination may be made as to whether to render to screen surface before revalidation (block 640). For example, rendering manager 320 may determine whether the speculatively rendered content is to be rendered to the screen surface before revalidation. If speculatively rendered content is rendered to the screen surface and revalidation results in new content being provided by content server 130, the previously rendered content may be overwritten and the user of client device 110 may experience screen flicker as the previously rendered content is overwritten. The resulting screen flicker may affect user experience and may, therefore, be undesirable. On the other hand, if the revalidation takes a long time (e.g., several seconds), the user may have to wait a long time for the content to be displayed, which may also reduce user experience. Furthermore, some documents may be less likely to change in content and therefore rendering to the screen surface before revalidation may not have any adverse effects on user experience, as the speculatively rendered content may be correct. Thus, in some situations, it may be desirable to wait for revalidation before rendering to the screen surface, while in other situations, it may be desirable to render to the screen surface before revalidation. Rendering manager 320 may make a decision as to whether to render to screen surface based on one or more factors.

Rendering manager 320 may use content change probability function 500 to generate a content change probability score 570 for the particular document. In one example, content change probability score 570 may be computed offline (e.g., by content change statistics server 140 or by rendering manager 320) and stored in content change probability information 440 of document record 401. In another example, rendering manager 320 may request content change probability score 570 from content change statistics server 140 during speculative rendering. In yet another example, content change probability score 570 may be computed during speculative rendering (e.g., by content change statistics server 140 or by rendering manager 320).

Rendering manager 320 may determine whether content change probability score 570 is less than a content change probability threshold. If the content change probability score 570 is less than a content change probability threshold, rendering manager 320 may determine that the content of the particular document has likely not changed and may render to the screen surface before revalidation. If the content change probability score 570 is greater than or equal to a content change probability threshold, rendering manager 320 may determine that the content of the particular document has likely changed since the cached copy was stored and may wait to render to the screen surface until revalidation has been completed.

Rendering manager 320 may further determine whether to render to the screen surface before revalidation based on how long client device 110 has been waiting for revalidation. For example, if client device 110 waits for revalidation longer than a revalidation wait time threshold (e.g., 3 seconds), rendering manager 320 may render the speculatively rendered content regardless of a decision based on content change probability score 570. A user of client device 110 may prefer to view content that may not be entirely correct, and may be willing to see screen flicker as the content is overwritten, rather than having to wait longer while nothing appears to be happening.

If it is determined that content is not to be rendered before revalidation (block 640—NO), waiting may occur for revalidation to occur before displaying the document (block 645). For example, rendering manager 320 may wait for revalidation from content server 130. Processing may continue to block 660. If it is determined that content is to be rendered before revalidation (block 640—YES), content rendered speculatively may be displayed (block 650). For example, rendering manager 320 may provide the speculatively rendered content to display 216 or display 254.

Revalidated content may be received (block 660). For example, at some later time, content request manager 340 may receive revalidated content from content server 130. Revalidated content may be received at any point during speculative rendering (e.g., while a particular work item is being processed or a particular resource is being retrieved) or after speculative rendering has been completed.

Continuing to FIG. 6B, a determination may be made as to whether the revalidated content differs from the cached content (block 670). For example, rendering manager 320 may compare the revalidated content with the content stored in document content field 450 of the cached document record 401.

If it is determined that the revalidated content does not differ from the cached content (block 670—NO), the speculatively rendered version may be kept (block 675). For example, rendering manager 320 may determine that there was no change in the content of the particular document and may keep the speculatively rendered version (which may at this point be ready for rendering to screen or may already have been rendered to the screen).

If it is determined that the revalidated content differs from the cached content (block 760—YES), work items that depend on invalid resources may be discarded (block 680). For example, rendering manager 320 may identify work items associated with changed content. In some situations, not all work items depending on invalid resources may be discarded. For example, rendering manager 320 may treat different types of resources in different ways and may apply different types of analysis to different types of work items associated with changed content. For example, if an image is determined to have changed from the cached version of the image, rendering manager 320 may determine whether the size of the image has changed. If the size of the image has not changed, the layout of the document may not have been affected and rendering manager 320 may not need to discard work items that perform a layout of the document using the changed image. Rather, rendering manager 320 may replace the cached version of the image with the revalidated version of the image and keep the layout work items. On the other hand, if the size of the image has changed, rendering manager 320 may discard the layout work items.

Constructing the work items graph using the revalidated content may be resumed (block 690). For example, rendering manager 320 may resume constructing a work items graph using the revalidated content. The document may be displayed based on the revalidated content (block 695). For example, rendering manager 320 may render the revalidated content to the screen surface and provide the rendered content to display 216 or display 254.

Figure 7A:
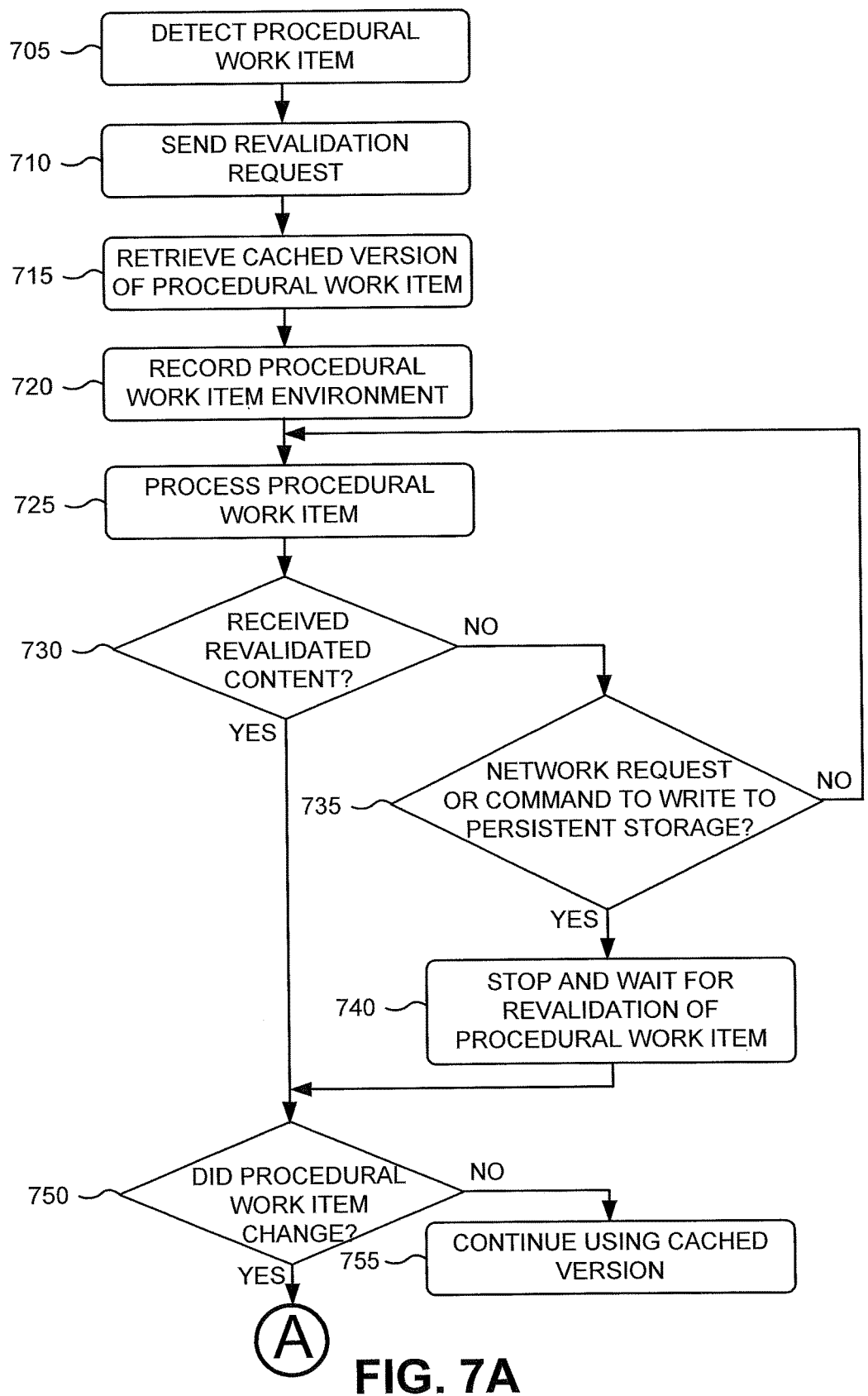
FIGS. 7A-7B are flowcharts of an example process for processing a procedural work item according to an implementation described herein.
Figure 7B:
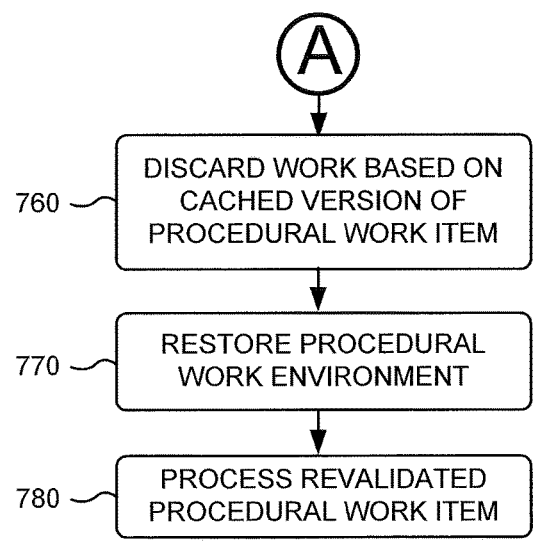

FIGS. 7A-7B are flowcharts of an example process for processing a procedural work item according to an implementation described herein. In one implementation, the process of FIGS. 7A-7B may be performed by client device 110. In other implementations, some or all of the process of FIGS. 7A-7B may be performed by another device or a group of devices separate and/or possibly remote from or including client device 110.

The process of FIG. 7A may include detecting a procedural work item (block 705). For example, in the process of constructing a work items graph, rendering manager 320 may encounter a procedural work item. A procedural work item may correspond to any work item based on a set of instructions that need to be performed in sequence (e.g., a script). For example, a procedural work item may include a client-side scripting file (e.g., a Javascript file, a VBScript file, a Jscript file, an ActionScript file, an HTML 5 script file, etc.) or any file that includes one or more processes to be performed in sequence (e.g., a CSS file). A procedural work item may be speculatively executed, as long as an environment associated with the procedural work item is recorded before and after execution, so that the environment may be reset if the procedural work item has changed. Furthermore, speculative execution of the procedural work item may need to be stopped if the procedural work item issues network requests or attempts to write to persistent storage on client device 110.

A revalidation request may be sent (block 710). Block 710 may correspond to block 630 of FIG. 6A. For example, content request manager 340 may send a request to content server 130 to revalidate the content associated with the particular document associated with the procedural work item. While client device 110 awaits revalidation from content server 130, speculative execution of the procedural work item may be performed.

A cached version of the procedural work item may be retrieved (block 715). For example, rendering manager 320 may retrieve a cached version of a Javascript associated with the particular document. The procedural work item environment may be recorded (block 720). For example, rendering manager 320 may record all Javascript environment variables before initiating execution of the Javascript. The procedural work item may be processed (block 725). For example, rendering manager 320 may start executing the Javascript.

A determination may be made as to whether revalidated content has been received (block 730). For example, rendering manager 320 may determine whether, after beginning to process the procedural work item, revalidated content has been received from content server 130.

If it is determined that revalidated content has not been received (block 730—NO), a determination may be made as to whether a network request or a command to write to persistent storage has been detected (block 735). For example, rendering manager 320 may determine whether an instruction from the Javascript includes a network request or a request to write to persistent storage of client device 110. In one example, rendering manager 320 may compare a pending instruction from the Javascript file to a stored list of instructions associated with network requests or requests to write to persistent storage. In another example, rendering manager 320 may detect a network request or request to write to persistent storage using another technique. Speculative execution of the procedural work item may need to be stopped if a network request is detected or if a request to write to persistent storage is detected, because such actions cannot be reversed should it be determined that the procedural work item has changed.

If it is determined that a network request or a command to write to persistent storage has not been detected (block 735—NO), the process may return to block 725, for further processing of the procedural work item. If it is determined that a network request or a command to write to persistent storage has been detected (block 735—YES), processing of the procedural work item may stop and waiting may occur for revalidation of the procedural work item (block 740). For example, rendering manager 320 may stop execution of the Javascript and may wait for revalidation from content server 130, before continuing with execution of the Javascript. Processing may continue to block 750.

Returning to block 730, if it is determined that revalidated content has been received (block 730—YES), a determination may be made as to whether the procedural work item has changed (block 750). For example, rendering manager 320 may compare a revalidated version of the Javascript file with the cached version of the Javascript file to determine whether the Javascript file has changed. If it is determined that the procedural work item has not changed (block 750—NO), the process may continue using the cached version (block 755). For example, rendering manager 320 may continue using the cached version of the Javascript file without interruption.

Continuing to FIG. 7B, if it is determined that the procedural work item has changed (block 750—YES), work based on the cached version of the procedural work item may be discarded (block 760). For example, rendering manager 320 may discard the work performed using the cached version of the Javascript file.

The procedural work item environment may be restored (block 770). For example, rendering manager 320 may restore the environmental Javascript variables that were saved before execution of the cached version of the Javascript file was initiated. The revalidated procedural work item may be processed (block 780). For example, rendering manager 320 may execute the revalidated Javascript file based on the restored Javascript environment.

Example Graph of Work Items

Figure 8:
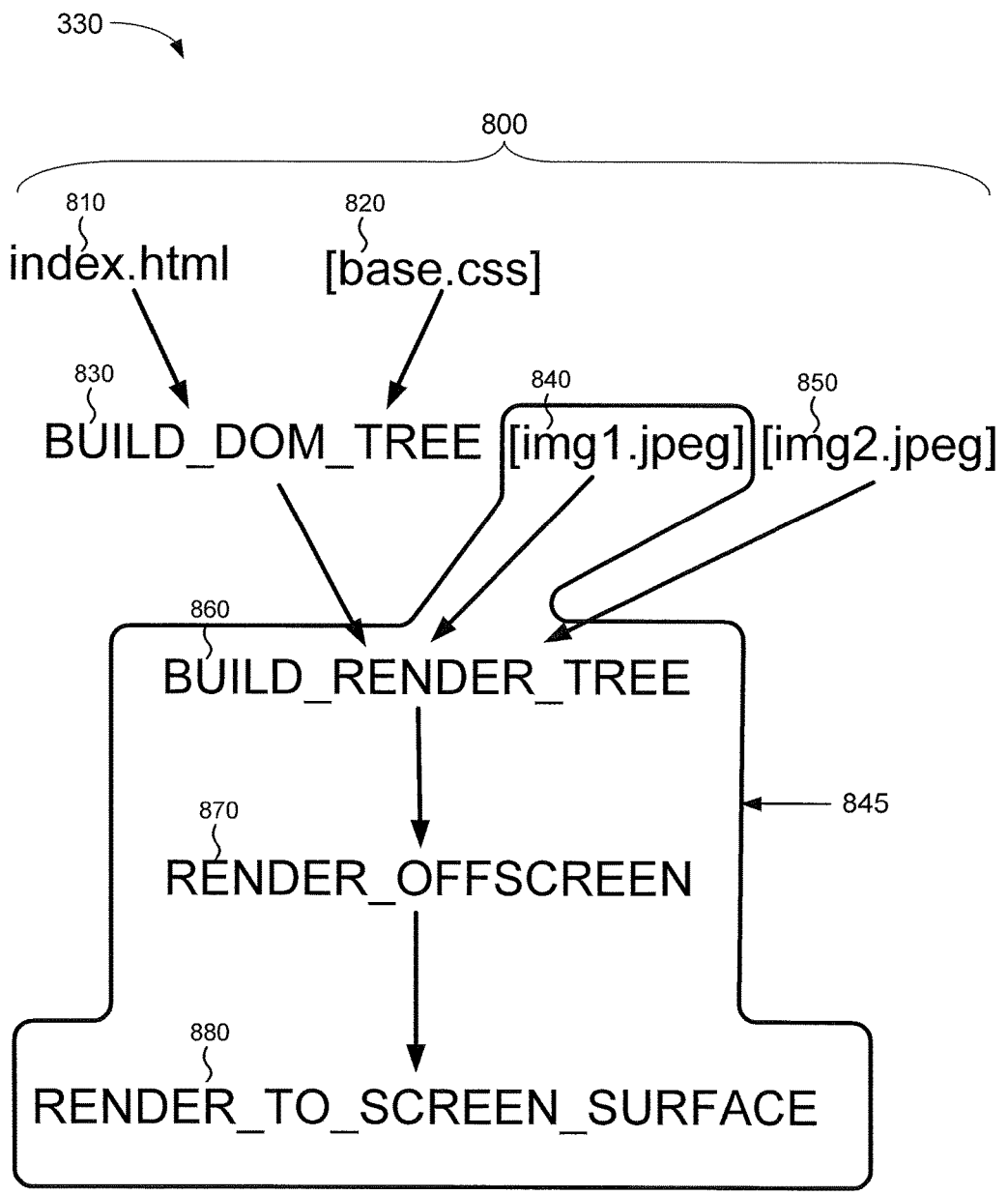
FIG. 8 is an example of a work item graph according to an implementation described herein.

FIG. 8 is an example of a work item graph 800 that may be generated in work items graph memory 330 according to an implementation described herein. In the example of work item graph 800, resources work items are shown in small letters, with cached resources shown in brackets, and process work items are shown in capital letters. The process of the example of FIG. 8 may include the user requesting a document using a browser application. In response, rendering manager 320 may fetch an index.html file 810 (which was not cacheable) from content server 130. Based on index.html file 810, rendering manager 320 determines that it needs CSS file base.css 820, first image file img1.jpeg 840, and second image file img2.jpeg 850, which may be stored in cache memory 310.

Rendering manager 320 may issue an HTTP GET command to content server 130 to retrieve base.css, img1.jpeg, and img2.jpeg, and may continue to perform speculative rendering using the cached version of base.css, img1.jpeg, and img2.jpeg while awaiting revalidation. The HTTP GET command may include last-modified-time information previously received from content server 130 and may also include a unique content identifier (e.g., a hash value based on the cached content). Content server 130 may compare the last-modified-time and the unique content identifier with a latest modified time of the content maintained by content server 130 and may determine whether the content has changed. If the content has changed, content server 130 may send new content and may also send a new set of cache control headers if client device 110 is allowed to cache the new content.

While waiting for a revalidation response from content server 130, rendering manager 320 may build a document object model tree by running work item BUILD_DOM_TREE 830, followed by building a render tree by running work item BUILD_RENDER_TREE 850. The document object model tree may provide a structured representation of objects that correspond to elements of the document. The render tree may generate a layout of the object and may depend on factors such as screen size and/or font choices and may be built by laying out times from the document object tree. Assume this process takes about 0.5 seconds, at the end of which rendering manager 320 is still waiting for the revalidated content from content server 130.

Rendering manager 320 may continue with building an offscreen bitmap of the contents of the document by running work item RENDER_OFFSCREEN 870. At this point, rendering manager 320 may determine content change probability score 570 for the document and may determine that content change probability score 570 is greater than a content change probability threshold, indicating that the document has a high probability of change. Therefore, rendering manager 320 may decide not to render the speculatively rendered content to a screen surface. However, assume that rendering manager 320 waits for the revalidated content longer than a revalidation wait time threshold (e.g., 3 seconds), at which point rendering manager 320 may decide to render to the screen surface by running work item RENDER_TO_SCREEN_SURFACE 880.

After rendering manager 320 starts working on work item RENDER_TO_SCREEN_SURFACE 880, client device 110 may receive the revalidated content from content server 310. Content server 310 may indicate that CSS file base.css 820 and second image file img2.jpeg 850 have not been modified, but that first image file img1.jpeg 840 has changed. In response, rendering manager 320 may invalidate all work items that depend on first image file img1.jpeg 840 (shown in FIG. 8 as item 845). For example, the size of first image file img1.jpeg 840 may have changed, which may substantially affect the layout of the document. Thus, rendering manager 320 may discard work item BUILD_RENDER_TREE 860, work item RENDER_OFFSCREEN 870, and work item RENDER_TO_SCREEN_SURFACE 880. Rendering manager 320 may start working on work item BUILD_RENDER_TREE 860 using the revalidated content for first image file img1.jpeg 840.

Thus, in the example of work item graph 800, by using speculative rendering, rendering manager 320 may have saved time by building the document object tree of the document before receiving a response from content server 310, resulting in the document being displayed in a shorter amount of time and improving the user's experience.

CONCLUSION

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6A, 6B, 7A, and 7B, the order of the blocks may be modified in other implementations. Further, non-dependent blocks may be performed in parallel.

Also, certain portions of the implementations may have been described as "component" or "manager" that performs one or more functions. The terms "component" or "manager" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   determining, by a computer device, a content change probability score that measures a likelihood of change associated with a first document, wherein the content change probability score is computed as a sum of two or more parameter values associated with the first document;
   storing, by the computer device, the content change probability score in a record associated with the first document;
   receiving, by the computer device, a request for the first document;
   sending, by the computer device, a request for revalidated content associated with the first document;
   retrieving, by the computer device, the content change probability score for the first document from the record;
   determining, by the computer device, a relationship between the content change probability score and a particular threshold;
   using, by the computer device, a speculative rendering to render the first document after determining the relationship between the content change probability score and the particular threshold and before receiving the revalidated content associated with the first document;
   receiving a request for a second document;

sending a request for revalidated content associated with the second document;
determining a period of time that the computer device is waiting for the revalidated content associated with the second document;
determining that the period of time satisfies a threshold; and
performing, based on determining that the period of time satisfies the threshold, a speculative rendering to render the second document.

2. The method of claim 1, wherein the two or more parameter values comprise at least one of a date or a time when the first document was last accessed.

3. The method of claim 1, further comprising:
receiving the revalidated content associated with the first document as a response to the request for the revalidated content; and
performing a rendering of the first document based on the revalidated content associated with the first document.

4. The method of claim 3, wherein performing the rendering of the first document comprises:
determining, after receiving the revalidated content associated with the first document, that the revalidated content associated with the first document is different from cached content that is used for the speculative rendering for the first document; and
performing the rendering of the first document based on the revalidated content associated with the first document, after determining that the revalidated content associated with the first document is different from the cached content.

5. The method of claim 1, wherein the content change probability score is determined offline.

6. The method of claim 1, further comprising:
receiving a request for a third document;
determining another content change probability score associated with the third document;
determining that the another content change probability score is equal to or greater than the particular threshold;
sending a request for revalidated content associated with the third document; and
waiting, without using a speculative rendering to render the third document, for the revalidated content associated with the third document, based on determining that the another content change probability score is equal to or greater than the particular threshold.

7. The method of claim 6, further comprising:
receiving the revalidated content associated with the third document; and
performing another rendering of the third document based on the revalidated content associated with the third document.

8. A system comprising:
one or more processors configured to:
receive a request for a document;
send a request for revalidated content associated with the document;
determine a content change probability score that measures a likelihood of change associated with the document;
determine a relationship of the content change probability score to a particular threshold;
perform a speculative rendering of the document after determining the relationship of the content change probability score to the particular threshold and before receiving the revalidated content associated with the document;
receive another request for another document;
send another request for other revalidated content associated with the other document;
determine a period of time that the system is waiting for the other revalidated content;
determine that the period of time satisfies a threshold; and
perform, based on determining that the period of time satisfies the threshold, another speculative rendering to render the other document.

9. The system of claim 8, where, when determining the content change probability score, the one or more processors are configured to:
determine values for two or more parameters associated with the document, and
determine the content change probability score based on the values for the two or more parameters associated with the document.

10. The system of claim 9, where the two or more parameters associated with the document include two or more of:
a maximum cache age associated with the document,
a content type associated with the document, or
frequency information that indicates how often content, associated with the document, changes.

11. The system of claim 8, where the one or more processors are further configured to:
receive the revalidated content associated with the document as a response to the request for the revalidated content;
determine that the revalidated content does not differ from cached content that is used to perform the speculative rendering; and
keep, without performing a rendering of the document based on the revalidated content, the speculative rendering of the document after determining that the revalidated content does not differ from the cached content.

12. The system of claim 8, where, when sending the request for the revalidated content, the one or more processors are configured to:
determine that a cached version of the document is available,
determine that there is a need to revalidate the document after determining that the cached version is available, and
send the request for the revalidated content based on determining that there is the need to revalidate the document.

13. The system of claim 12, where, when determining that there is the need to revalidate the document, the one or more processors are configured to:
determine a time period when the cached version was stored in a cache memory associated with the system,
determine that the time period exceeds a maximum cache age associated with the document, and
determine that there is the need to revalidate the content based on the time period exceeding the maximum cache age.

14. A non-transitory computer-readable medium storing instructions, the instructions comprising:
one or more instructions that, when executed by at least one processor, cause at least one processor to:
store a content change probability score in a record associated with a document, wherein the content change probability score is computed as a sum of two or more parameter values associated with the document;

receive a request for the document;
retrieve the content change probability score for the document from the record, the content change probability score measuring a likelihood of change associated with the document;
determine whether the content change probability score satisfies a particular threshold;
use a speculative rendering to render the document after determining whether the content change probability score satisfies the particular threshold and before receiving revalidated content associated with the document;
receive a request for another document;
send a request for revalidated content associated with the another document;
determine a period of time that a computing device is waiting for the revalidated content associated with the another document;
determine that the period of time satisfies a threshold; and
perform, based on determining that the period of time satisfies the threshold, another speculative rendering to render the another document.

15. The non-transitory computer-readable medium of claim 14, where the instructions further comprise:
one or more instructions that, when executed by the at least one processor, cause the at least one processor to:
determine that a cached version of the document is available;
determine that there is a need to revalidate the document after determining that the cached version is available; and
send the request for the revalidated content associated with the document based on determining that there is the need to revalidate the document.

16. The non-transitory computer-readable medium of claim 14, where the two or more parameter values comprise at least one of:
information indicating whether the document is associated with one or more particular keywords or phrases, or update history associated with the document.

17. The non-transitory computer-readable medium of claim 14, where the content change probability score is determined offline.

18. The non-transitory computer-readable medium of claim 14, where the instructions further comprise:
one or more instructions that, when executed by the at least one processor, cause the at least one processor to:
receive the revalidated content; and
perform, after using the speculative rendering to render the document, a rendering of the document based on the revalidated content.

19. The non-transitory computer-readable medium of claim 18, where the speculative rendering is performed as a plurality of work items, and
where the one or more instructions to perform the rendering of the document based on the revalidated content comprises:
one or more instructions that, when executed by the at least one processor, cause the at least one processor to:
determine invalid work items of the plurality of work items based on the revalidated content;
discard the invalid work items; and
perform the rendering of the document based on the revalidated content and one or more work items, of the plurality of work items, that were not discarded.

* * * * *